May 27, 1969
F. A. KANE, JR
3,446,195
DEVICE FOR CONTROLLING THE ADMISSION AND COMBUSTION OF
FUEL IN AN INTERNAL COMBUSTION ENGINE
Filed Dec. 8, 1967
Sheet 2 of 6
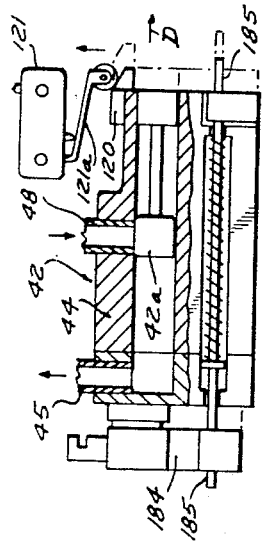
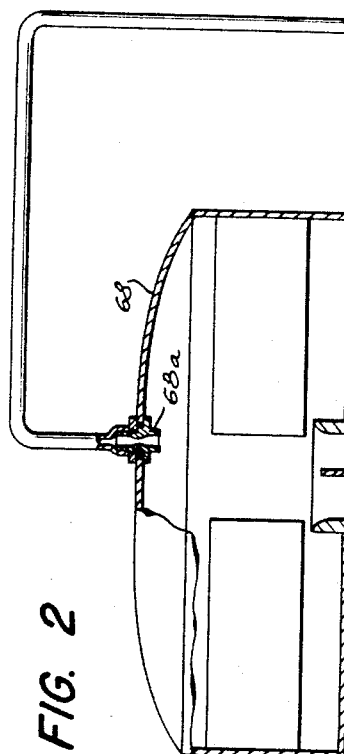
INVENTOR.
FRANK A. KANE, JR.
BY
Emanuel R. Posnock
ATTORNEY

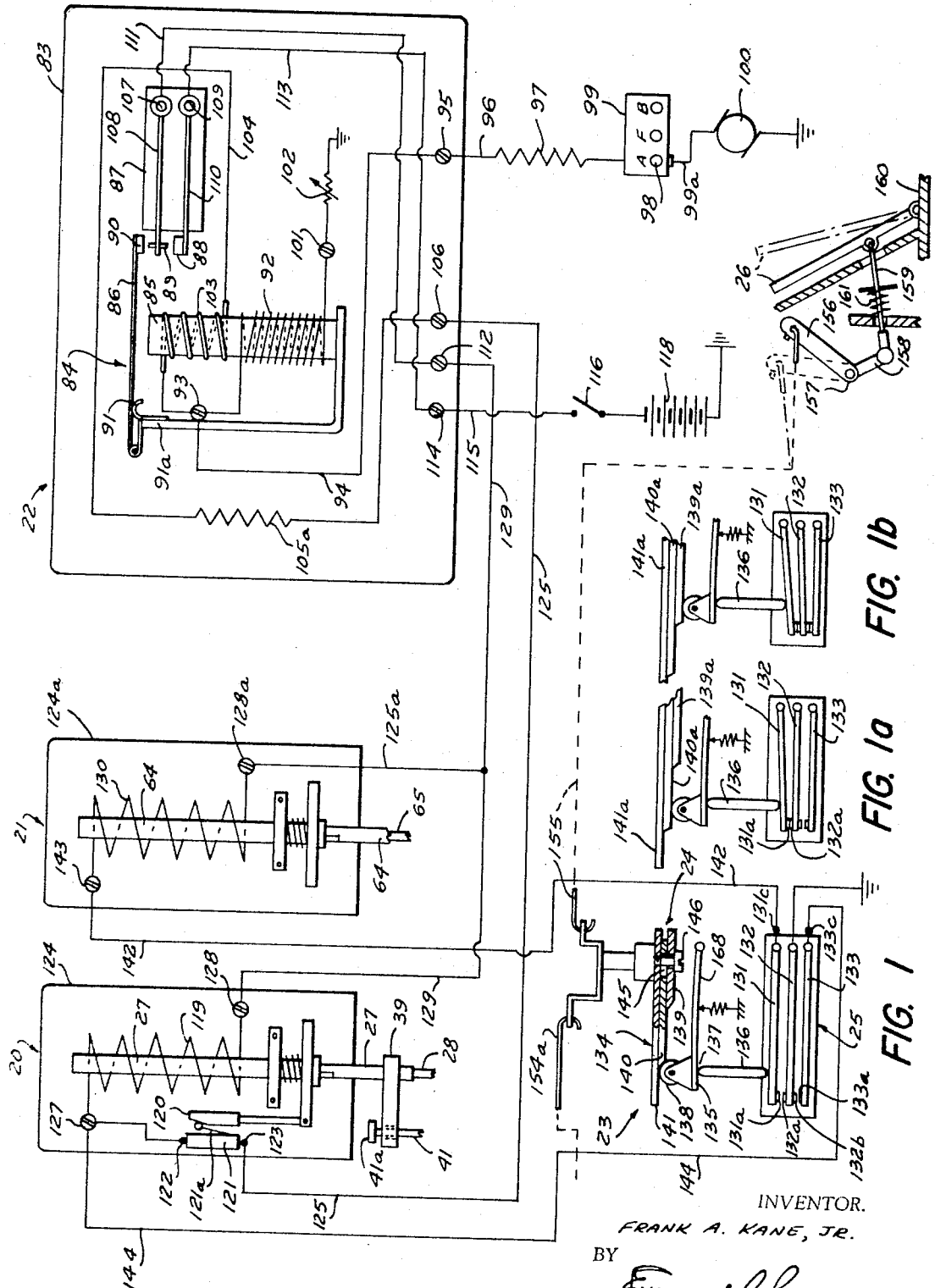

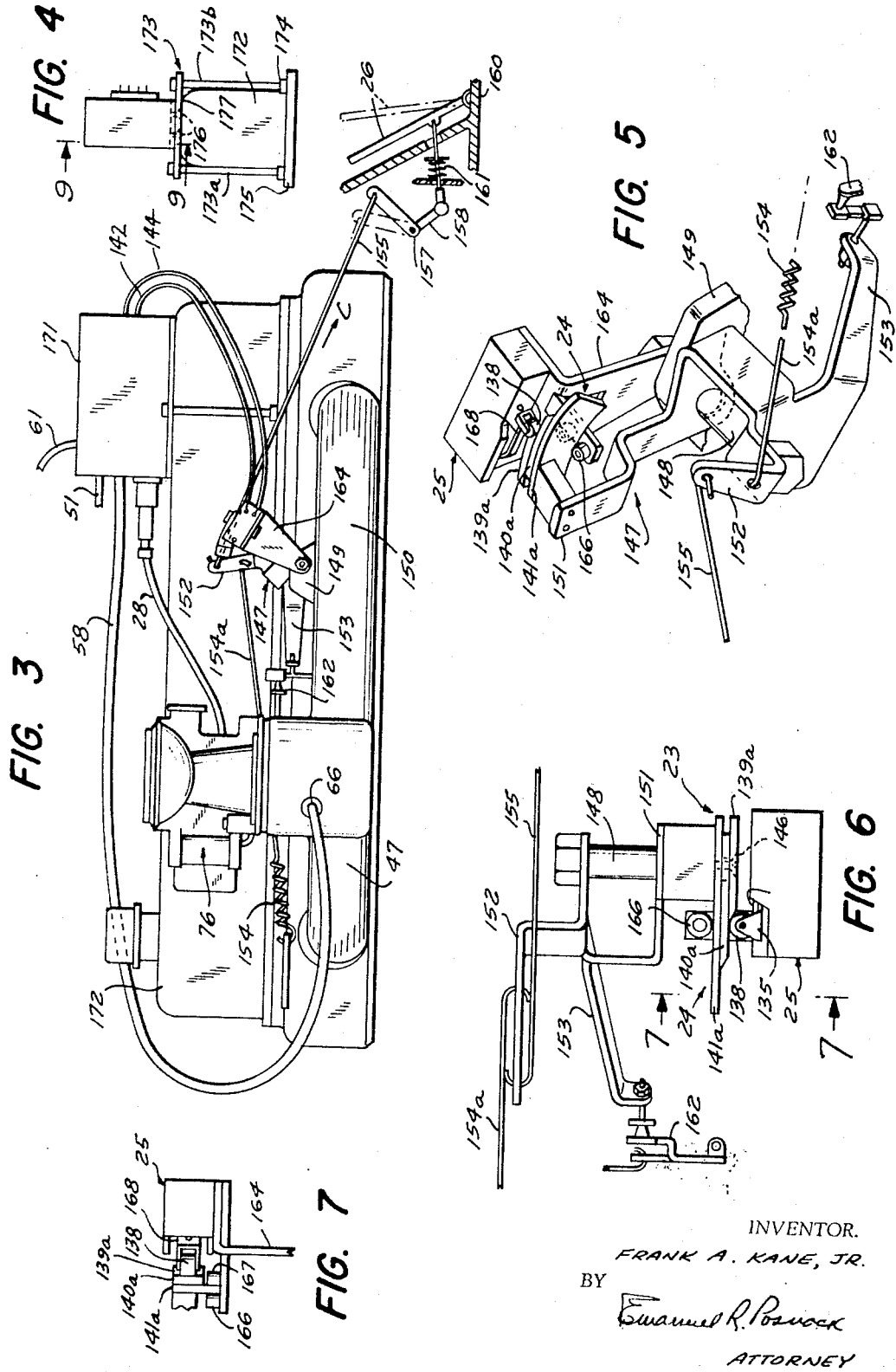

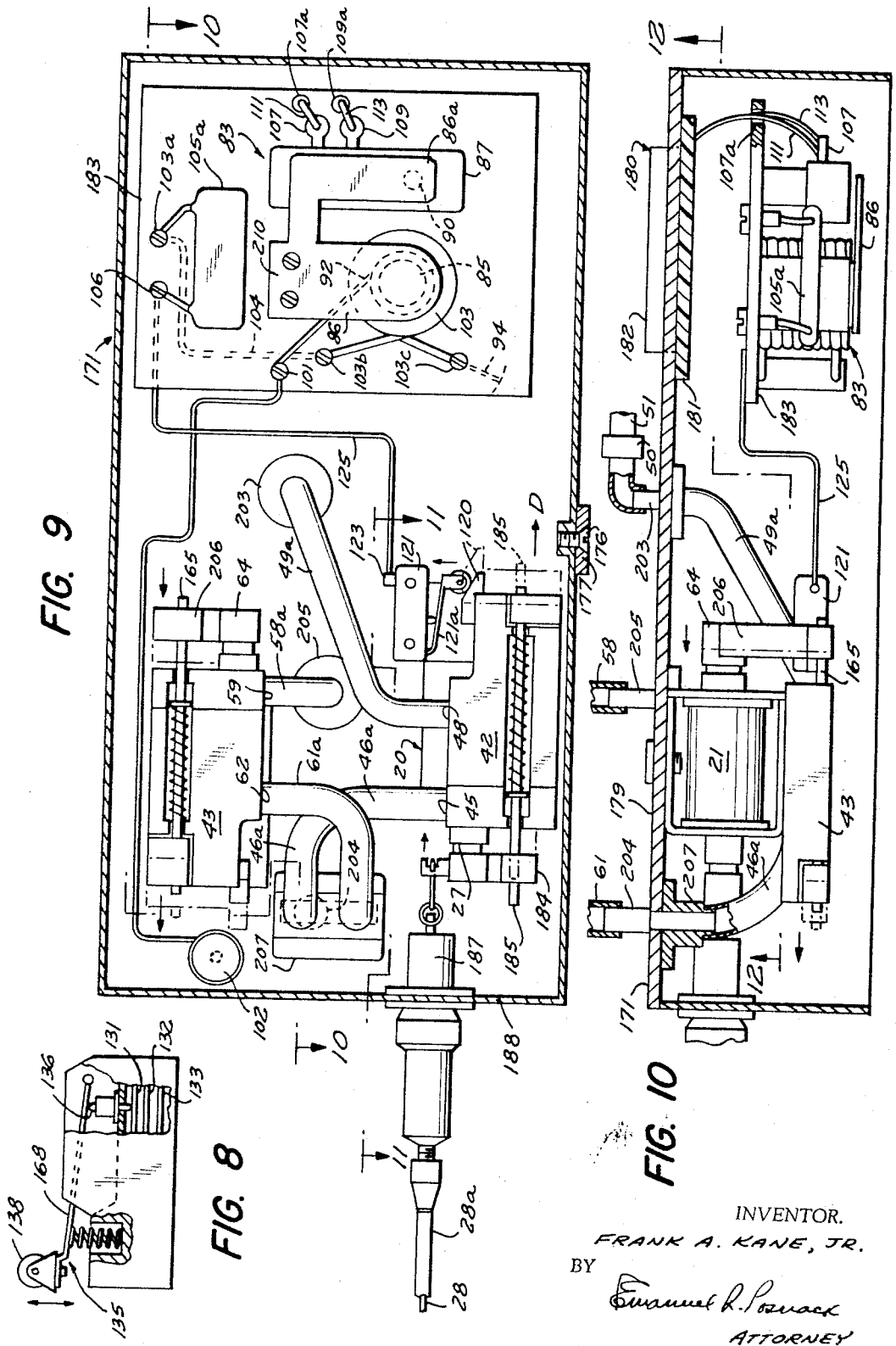

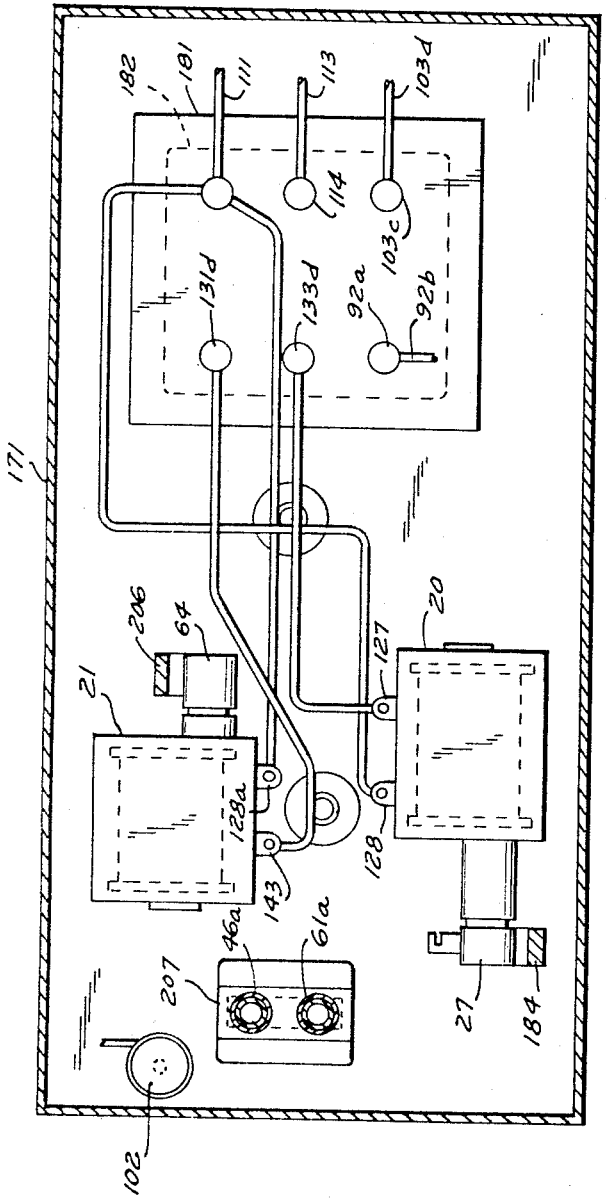
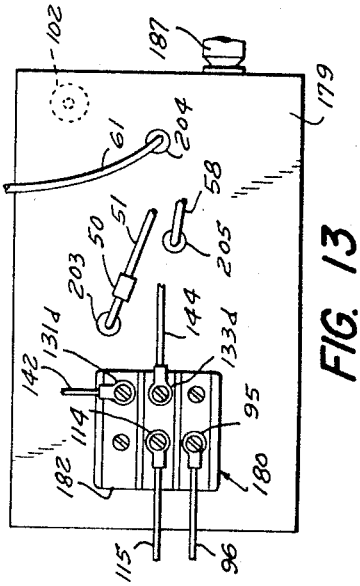
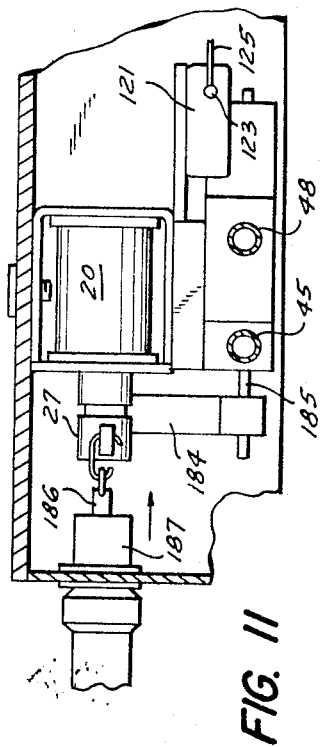
FIG. 12
FIG. 13
FIG. 11
INVENTOR.
FRANK A. KANE, JR.
BY
Emanuel R. Posnack
ATTORNEY

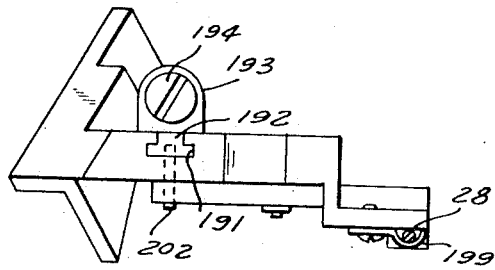
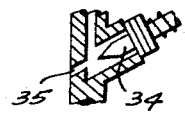
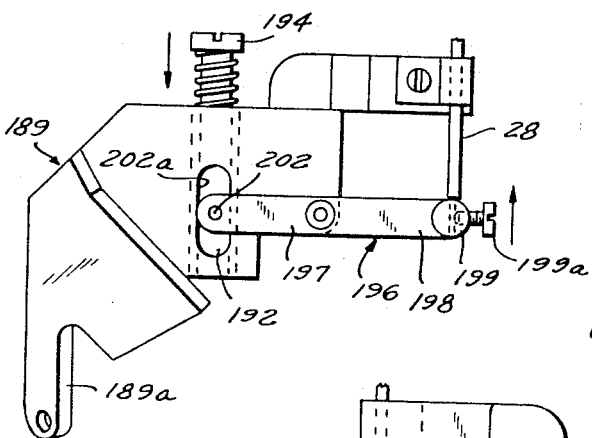
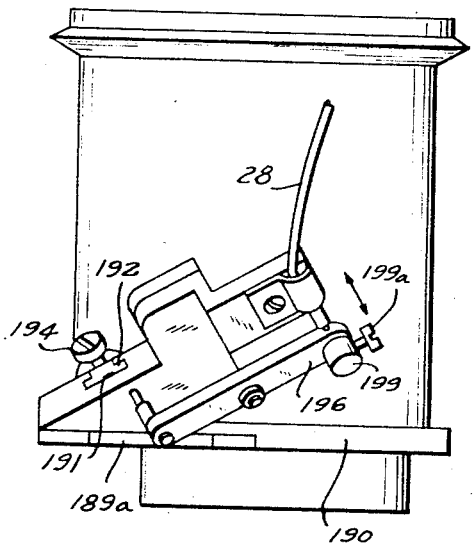
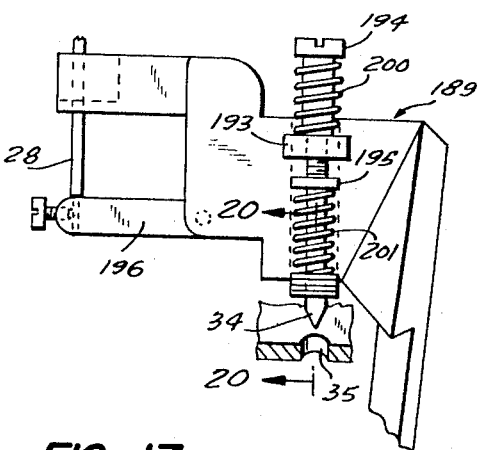
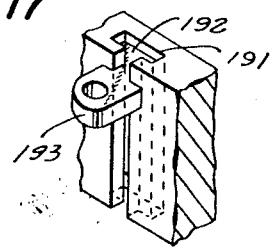
INVENTOR.
FRANK A. KANE, JR.
BY
Emanuel R. Posnack
ATTORNEY

United States Patent Office 3,446,195
Patented May 27, 1969

3,446,195
DEVICE FOR CONTROLLING THE ADMISSION AND COMBUSTION OF FUEL IN AN INTERNAL COMBUSTION ENGINE
Frank A. Kane, Jr., Monrovia, Calif., assignor of one-fourth each to Girard F. Oberrender and Emanuel R. Posnack, both of New York, N.Y., and one-fourth to the estate of Frank A. Kane, administrator being Frank A. Kane, Jr., Monrovia, Calif.
Filed Dec. 8, 1967, Ser. No. 689,078
Int. Cl. F02d 31/00, 11/10
U.S. Cl. 123—97
34 Claims

ABSTRACT OF THE DISCLOSURE

A device for controlling the admission and combustion of fuel in an internal combustion engine, and for effecting reductions in unburnt hydrocarbons, carbon monoxide and nitrogen oxides in automobile exhaust emissions. Spark control and air admission means are actuated, through an electro-mechanical system responsive to engine speed, for advancing the spark and coactively introducing additional air during deceleration and at cruising or partial throttle speeds. The said spark and air control is co-actively combined with an idler shut-off and float bowl pressure-control means for preventing the introduction of unduly rich fuel and gas mixtures during deceleration. Means are provided for restoring normal settings, that is, retarded spark timing and air-fuel ratios required at acceleration and full-power operation, said electro-mechanical system effecting such restoration instantly and without the danger of stalling.

The field of the invention

This invention relates to the control of the admission and combustion of fuel in internal combustion engines, and is particularly, though not exclusively, directed to the efficient combustion of fuel so as to eliminate or minimize smog producing emissions from automobile exhausts.

The known art

The growing need to reduce such smog-producing and harmful motor vehicle emissions as unburnt hydrocarbons, carbon monoxide and nitrogen oxides, and the resulting legislative efforts to remedy this unwholesome situation, have brought forth many ideas and devices for the beneficial control of automobile exhaust gases. Among these are applicant's prior inventions described in Patent Nos. 2,877,997, 3,003,487 and 3,080,858. These relate to the reduction in the fuel flow to the engine during deceleration and the positive re-establishment of the flow after the deceleration cycle. In the device of said Patent No. 2,877,997 the fuel flow is cut off through the idler orifice by the inrceased vacuum that prevails in the intake manifold during deceleration. In the device of said Patent No. 3,003,487, the idler shut-off is effected through the medium of a novel electro-mechanical system which renders the action independent of intake manifold pressure variations and pressure differentials between the intake manifold and in the atmosphere, so that the device could operate at all elevations without any adjustments—the system instantaneously and positively restoring the idler valve to its open normal position after the deceleration cycle. In the device of said Patent No. 3,080,858, the idler shut-off feature of the said previous patent is combined with means to produce an increased negative pressure in the float bowl upon deceleration, thereby reducing the flow of gasoline through the carburetor's main jet, so that two sources of excessive fuel flow due to deceleration are simultaneously controlled. Neither of applicant's said prior inventions effect spark timing and air controls during deceleration, cruising and accelerating conditions—the present invention being directed to such additional features, as will appear from the description hereinafter given.

Among other known expedients intended to reduce smog-producing emissions are the following: (a) a spark advance system for increasing the fuel-burning time during deceleration by the increased intake manifold vacuum pulls operative on a special distributor spark advance actuator—a system adapted for optimum use at only one altitude and requiring adjustments at different altitudes; (b) a built-in system of lean fuel at main and idler jets to reduce the amount of gasoline drawn in during deceleration and cruising, but having the consequent disadvantage of a sacrifice of needed power at accelerating conditions where higher fuel-air ratios are required; (c) catalytic devices to effect a chemical conversion of certain smog-producing exhaust gas ingredients, such as unburnt hydrocarbons, these devices being relatively expensive and requiring frequent replacement—and also being scientifically and economically unsound, first because they are operative only *after* the power stroke and therefore accomplish nothing in the way of preventing excess fuel from entering the engine or of increasing combustion efficiency, and second because they partially obstruct the exhaust path thereby creating a back pressure and causing loss of power; (d) direct-flame after-burner devices—air injection units—which pump air into the region of the exhaust ports to burn previously unburnt fuel—an arrangement which results in the gradual destruction of the exhaust valves due to the fact that such valves are open when the burning takes place, as well as to the prevailing high temperatures, such high temperatures causing excessive underhood temperatures and tending to cause back-firing—the pumps of such devices requiring careful maintenance and early replacement—such devices also having the above-mentioned disadvantages of being operative *after* the power stroke; (e) positive crank-case ventilation which recirculates and reuses unburnt "blow-by" gases that escape through the road draft tube, such gases, however, not only fouling spark plugs after some use, but also constituting a factor in hydrocarbon emissions when such unburnt gases pass between the pistons and the water-cooled "quench" areas of the cylinder.

Objectives of the invention

The present invention has for its main objective the provision of a device for controlling the admission and combustion of fuel in an internal combustion engine so as to effect, for the particular engine in which the device is installed, maximum fuel burning efficiency and corresponding reductions or elimination of such smog-producing ingredients of exhaust emissions as unburnt hydrocarbons, carbon monoxide and nitrogen oxides—without the aforesaid disadvantages of other known systems directed toward reducing smog-producing emissions of motor vehicles.

In carrying out the above objective, I have conceived and developed the invention herein described which, in its complete form and using a single electrical control not affected by intake manifold pressure variations, embodies means completely to cut off fuel through the idler orifice and reduce the fuel ejected from the main jet during deceleration at certain speeds, substantially in the manner taught in my previous inventions hereinabove referred to, but coactively connected to other novel means for providing more combustion time and more air during all deceleration conditions, including conditions of cruising and other partial throttle speeds, and for permitting instant change to optimum spark timing and fuel-air ratios during acceleration and full power operation.

Other specific objects of my invention include the following:

The advancing of the spark timing during deceleration and the simultaneous provision of additional air for effecting complete combustion during the extended burning period resulting from the advanced timing—and the accomplishment of this dual operation without affecting the required retarded spark timing or interfering with the conventional governor control thereof at high speeds or during high power engine demands;

The provision of additional air for the purpose of helping to burn the unburnt hydrocarbons in "blow-by" gases recirculated by positive crankcase ventilation systems;

The provision of positive means for effecting almost instantaneous changes between deceleration, crusing, passing and other high-power or high-speed conditions without the danger of stalling;

The provision of means to create lean air-fuel mixtures during deceleration and partial throttle conditions, and to change such mixtures to higher fuel-air ratios when required, without the need to make permanent carburetor adjustments or to modify conventional choke calibrations;

The provision of means to create and maintain, during cruising speeds as well as during deceleration, conditions of additional air supply and spark timing advances beyond that effected by standard diaphragm spark control systems, thereby using the prolonged and more efficient combustion to effect economies in fuel consumption, and taking full advantage of the fact that at cruising speeds there are no extra fuel demands such as would be required in passing, going up a hill or accelerating;

The use of the aforesaid electrical control to enable the device to operate at any locale or elevation, without the need to make special adjustments;

The effective and complete burning of fuel-air mixture in the combustion chamber and not after the power stroke, thereby obviating the danger of introducing into the cylinders and exhaust manifold smog-producing quantities of unburnt hydrocarbons, carbon monoxide and nitrogen oxides and, in consequence thereof, additionally increasing the efficiency of the engine.

It is a further object of this invention to accomplish said objectives by means of an extremely compact device that can be fabricated at a low cost, that can either be an integral part of an engine or be readily installed in standard internal combustion motor vehicles, and that will require minimum maintenance work or expense.

Other objects, features and advantages will appear from the drawings and the description hereinafter given.

SUMMARY OF THE INVENTION

The preferred embodiment of this invention comprises electromechanical control means operatively connected to a plurality of control members: the idler needle valve of the carburetor and a multiple-branch conduit system comprising three interconnected branch portions communicating with the intake manifold and operatively connected to spark-timing means, auxiliary air intake means and the carburetor float bowl, respectively—the said control means being responsive to engine r.p.m. In the particular form illustrated, said electro-mechanical control means include two solenoids and a relay control device responsive to generator voltage, one of the solenoids being operatively connected to said idler needle valve and to a valve controlling the float bowl pressure, the other solenoid being operatively connected to valve means controlling the spark-timing means and the auxiliary air supply, the said electro-mechanical control means being electrically connected to special switch means operatively connected to the gas pedal whereby different controls may be operatively actuated at different speed ranges. The said relay device—to be hereinafter described—is substantially like that referred to in said prior Patent Nos. 3,003,487 and 3,080,858.

More specifically, one of said solenoids, which is at times herein referred to as the "first solenoid," is connected to a dual-purpose valve member operative on two pipe lines. One of said lines is an air line communicating with the high-vacuum port of the intake manifold and, in the embodiment illustrated, leading from the air cleaner. The other of said pipe lines is a suction line communicating between said high-vacuum port of the intake manifold and the spark-control diaphragm. When, upon deceleration, said first solenoid is operatively actuated by said control relay and associated circuitry—as will more clearly hereinafter appear—the consequent opening of said valve will cause it simultaneously to perform dual functions. It will permit air to be drawn into the said intake manifold due to the negative pressure therein; and it will also act on the spark-control diaphragm to advance the spark timing—the advance being greater than that effected by standard suction means since the vacuum condition in the intake manifold below the throttle is greater than the vacuum prevailing at the region just above the throttle at which point the diaphragm actuating vacuum line is connected according to standard procedure. Since said first solenoid is actuated under predetermined deceleration conditions, the above-described dual action is effective, during such conditions, in advancing the spark to provide a longer combustion period, and at the same time in providing additional air to effect more complete burning of the fuel.

The other of said solenoids, the "second solenoid," is operatively connected to said idler needle valve and to a float bowl control valve. Upon the operative actuation of said second solenoid by said control relay and associated circuitry during deceleration, the needle valve will be actuated into its closed position to shut off all fuel flow through the idler orifice, and the float bowl valve will be actuated into its open position—at which position communication is established between the float bowl and the intake manifold, thereby increasing the vacuum in the float bowl chamber and consequently reducing the fuel flow through the main jet, substantially as taught in said prior Patent No. 3,080,858.

The piping with special check valves therein and the electrical connections between the components above described are interconnected and coactively arranged, so that a single operative actuation of the said control means responsive to the engine speed—the said control relay in the illustrated embodiment—will automatically actuate the said various means controlling the spark timing, air admission, idler shut-off and float bowl vacuum conditions. The arrangement is such that all four controls will be effective in preventing the introduction into the intake manifold of excess fuel due to increased vacuum conditions during deceleration, and increasing the burning time and insuring complete combustion at partial throttle speeds, including cruising speeds.

In the preferred embodiment the gas pedal has associated therewith switch and cam means whereby at predetermined positions of the pedal different circuits will be actuated. Upon deceleration under various speed conditions, the above-mentioned fuel and air admission and spark timing actions are brought into play and as will more clearly hereinafter appear, such conditions prevail until the operative action of the relay control member attains a sensitive holding condition at a predetermined speed above idling. The arrangement is such that when deceleration has reached what may be called a critical point—determined in the particular illustrated embodiment by the generator speed and the inertial action of the vehicle—the relay control will suddenly and positively release its operative holding action, thereby immediately restoring the gas and air flow and spark timing to normal conditions—without any such delay as might cause stalling. Such normal operating conditions occur during idling and predetermined speeds above cruising. When the gas pedal is depressed for such high speeds, the controls will be instantly rendered inoperative, permitting the vehicle to operate under fuel-air ratio and spark conditions according to increased power demands. Upon deceleration from the high-speed to cruising range, the spark advance and auxiliary air controls are actuated, and upon further deceleration the idler and float bowl controls are brought into play.

DESCRIPTION OF THE DRAWINGS

FIG. 1 is a schematic diagram of two the solenoids of the illustrated preferred form of my invention shown operatively connected to an electro-mechanical arrangement of a relay control device, the generator and the accelerator pedal of an automobile engine, and to a sequential cam-switch device for timing the operation of the various controls of this invention, said cam-switch device being shown electrically disconnected from said solenoids, the dot-dash lines showing the gas pedal in a position of partial deceleration.

FIG. 1a is a diagrammatic representation of the cam-switch device of FIG. 1, the contacts being shown in position for electrical connection with one of said solenoids.

FIG. 1b is a view substantially like 1a but showing the contacts of the cam-switch device in position for electrical connection to both said solenoids.

FIG. 2 is a fragmentary sectional elevation of an intake manifold and carburetor assembly with an air cleaner mounted in place, and a schematic representation of the two solenoids of FIG. 1, two control valves, two check valves and connecting piping means operatively connected to the intake manifold, the carburetor float bowl, the air cleaner, the distributor vacuum actuator and the carburetor mixture passageway, one of said solenoids being shown operatively connected by a Bowden wire to the idler valve, all in accordance with the system of this invention.

FIG. 3 is a side elevation of the assembly of the intake manifold, valve cover and carburetor of an internal combustion engine, showing a side elevation of the casing containing certain components of this invention mounted on the engine, certain piping and electrical conductors being shown extending from the casing, the cam-switch member of FIG. 1 being shown operatively in place and connected by linkage to the gas pedal, the dot-dash lines showing the pedal and associated elements in a position of deceleration.

FIG. 4 is a rear end view of the valve cover and casing of FIG. 3.

FIG. 5 is a fragmentary top perspective view, looking away from the engine, of the said cam-switch member and supporting bracket operatively mounted over the intake manifold casing.

FIG. 6 is a fragmentary plan view of the said cam-switch member and supporting bracket.

FIG. 7 is a fragmentary side view of the cam-switch member looking in the direction of arrows 7—7 of FIG. 6.

FIG. 8 is a side elevation of the switch component of said cam-switch member, portions being broken away for clarity.

FIG. 9 is a vertical section of the casing of FIG. 4 taken substantially along line 9—9 thereof, showing the internal components of said casing.

FIG. 10 is a section of FIG. 9 taken substantially along line 10—10 thereof.

FIG. 11 is a fragmentary section of FIG. 9 taken substantially along line 11—11 thereof.

FIG. 12 is a section of FIG. 10 taken along line 12—12 thereof.

FIG. 13 is a rear elevational view of the back wall of the casing, showing fragments of certain conductors and piping extending outwardly therefrom.

FIG. 14 is a side elevational view, partly in section, of the valve member and associated demagnetizing switch shown at the bottom of FIG. 9.

FIG. 15 is a front elevation of an embodiment of the idler valve mechanism operatively connected to the carburetor casing, the view showing a fragment of a Bowden wire adapted for operative connection to the upper solenoid of FIG. 2.

FIG. 16 is a top view of the said idler valve mechanism illustrated in FIG. 15.

FIG. 17 is a fragmentary rear perspective view of the device of FIG. 16, showing the connection between the slide member and the lug carrying the adjusting screw that coacts with said idler valve.

FIG. 18 is a front elevation of the idler valve mechanism of FIG. 16.

FIG. 19 is a rear elevation of the device of FIG. 16, showing the coacting adjusting screw and idler valve, a fragment of the carburetor wall being shown in relation to the retracted idler valve.

FIG. 20 is a fragmentary section of FIG. 19 taken substantially along line 20—20 thereof.

DESCRIPTION OF PREFERRED EMBODIMENT

In the embodiment of this invention semi-schematically illustrated in FIGURES 1 to 4, the broadly-referred to "electromechanical control means" comprise the "first" or air and spark control solenoid 21, the "second" or fuel control solenoid 20, and the control relay generally designated 22. The said respective solenoids 20 and 21 are at times broadly referred to as "electromechanical means" and the said control relay 22 as "electrical operating means," the latter being responsive to engine speeds according to the preferred form of the invention shown in the drawings and being substantially like the relay device referred to in my said prior Patent No. 3,080,858. The said relay and solenoids are electrically connected to the sequential cam-switch means generally designated 23, said latter means having the cam member 24 and switch 25, the cam member being operatively connected to the gas pedal 26—all in a manner to be more fully hereinbelow described.

Referring to the said electro-mechanical means, the plunger 27 of the solenoid 20 is connected to the Bowden wire 28 which is connected to the arm 29 of lever 30 by the spring wire 31. In the illustrated embodiment, substantially as shown in said Patent No. 3,080,858, a bracket 32 slidably supports the head 33 of the needle valve 34 operatively associated with the idler or low-speed fuel inlet 35, the spring 36 urging the valve outwardly into its open position. In abutting engagement with said head 33 of said needle valve 34 is the spring-loaded adjusting screw 37, the shank of said screw being in threaded engagement with the arm 38 of the said lever 30. The arrangement is such that upon an operative actuation of said solenoid and the consequent retraction of plunger 27, said Bowden wire is pulled upwardly to produce a counter-clockwise rotation of lever 30, whereupon the end of said screw 37 forces the needle valve 34 into closing engagement with the said idler orifice 35. When the solenoid 20 is de-energized, said needle valve is operatively returned by spring 36 to its normal open position—in the manner described in said Pat. No. 3,003,487.

The said plunger 27 of solenoid 20 carries the actuator arm 39 having a hole 40 therein through which extends the stem 41 of the float bowl control valve 42, the latter serving to control the main jet flow through its action on the float bowl pressure, this action being in cooperation with the spark and air control valve 43, all in a manner to be hereinafter described. The valve element 42a is slidably movable within valve casing 44, the arrangement being such that upon an operative energization of solenoid 20 and the consequent upward movement of its plunger 27, the arm 39 will engage the overlying head 41a of said stem 41 to lift said valve element 42 into its open position out of engagement with the outlet port 45 in said casing. Said port 45 communicates with the pipeline 46 which, as will more clearly hereinafter appear, is operatively connected to the intake manifold 47. Connected to and in communication with the inlet port 48 of said casing 44 is another pipeline 49 extending to the air-bleed member 50 corresponding to a similar member shown and described in said Patent No. 3,080,858, the pipeline 51 from member 50 extending to the float bowl 52—the terminal 53 of said pipeline being connected to the top wall 54 of the said float bowl, whereby the latter pipeline is in communication with the air chamber 55 thereof. Said float bowl construction and associated jet 56 in the fuel mixture passageway 57 are substantially like the corresponding members illustrated in my said prior Patent No. 3,080,858.

The said air and spark control valve 43 cooperates with the said float bowl valve 42 through a conduit having a piping branch comprising the pipeline 58 communicating between the port 59 of the casing 60 and the intake manifold 47, the pipeline 61 connecting the other port 62 of said casing 60 with the cross fitting 63, the said pipelines 46, 49 and 51. The arrangement is such that when both solenoids 20 and 21 are energized, the said float bowl control valve 42 is operatively opened in the manner aforesaid, and the said spark and air control valve 43 is also operatively opened by the pull of the solenoid plunger 64 of solenoid 21 on the valve stem 65.

There will then be communication between the interior of the intake manifold 47 and the said interior chamber 55 of the float bowl 52 through pipes 58, 61, 46, 49, 51, so that air will be drawn from the float bowl into the intake manifold due to the negative pressure prevailing in the latter. Accordingly, when there is an increase in manifold vacuum, such as occurs during deceleration, a partial vacuum will be created within the float bowl 52, consequently reducing the flow of fuel from the main jet 56, this condition being maintained as long as the valves 42 and 43 are open. The operative actuation of solenoid 20 thus accomplishes the dual function of closing the idler orifice 35 and creating a partial vacuum in the air chamber of the float bowl 52, thereby serving to reduce the flow of fuel through the main jet 56 as aforesaid. This action is thus effective in reducing the introduction of excess raw fuel into the intake manifold due to the increased vacuum conditions prevailing within the intake manifold during deceleration.

It is to be noted that pipe 58 leading from the outlet port 59 of spark control valve 43 is connected to the intake manifold 47 at point 66 which is below the throttle, and the pipeline 61 joined to the inlet port 62 of said valve 43 is connected, through said fitting 63, to pipe 67 connected to the fitting 68a of the conventional air cleaner 68—the air inlet to said fuel mixture passageway 57 in the particular construction illustrated. It is understood that pipe 67 can, within the contemplation of this invention, be connected to the carburetor air inlet region 57a. The said fuel mixture passageway 57, which also communicates with the intake manifold, is thus by-passed by the conduit's branch section comprising the pipes 67, 61 and 58 which conduct auxiliary air to the intake manifold in a manner hereinbelow set forth.

Also connected to the cross fitting 63 is the pipe 69 which contains therein the check valve 70 and which communicates both with the conventional distributor vacuum actuator 72 and the pipeline 73 containing the check valve 74, pipeline 73 extending to and being connected to the carburetor casing 76 in the conventional position just above the throttle 77.

Upon the actuation of the said spark and their air control solenoid 21 and the consequent opening of valve 43, communication is established between the intake manifold 47 and the spark control diaphragm unit 72—communication being established through the conduit's branch portion comprising the pipes 58, 61, 69 and check valve 70. It will be noted that due to the suction in the intake manifold, the check valve 74 will be in closed position, since the valve element 78 will be drawn in the direction of arrow A thereby cutting off communication between said spark advance actuator 72 and said pipe 73 leading to the barburetor port 79 above the throttle 77. It should be observed that when the spark and air control valve 43 is closed, said pipe 73 controls the spark timing through the suction action derived from said port 79, the vacuum pull opening said check valve element 78 in the direction of arrow B, and permitting the action of spring 81, to advance the spark under the prevailing conditions. The opening of said spark and air control valve 43, however, permits a much greater pull to be exerted, during deceleration, against the diaphragm 80 than is possible through the suction action in pipe 73 inasmuch as the prevailing vacuum conditions at the high vacuum port 66 where pipe 58 connects with the intake manifold is much greater than the prevailing vacuum conditions above the partly closed throttle.

When the said spark and air control valve 43 is operatively opened, as aforesaid, auxiliary air from the air cleaner 68 is drawn through pipes 67, 61 and 58 into the intake manifold through said port 66. Hence, during the longer combustion period effected by the relatively greater spark advance produced by the action of said valve 43, more air is also being drawn into the intake manifold to effect more complete combustion.

When the said spark and air control valve 43 is closed—that is, when the solenoids 20 and 21 are in their normally inoperative positions—the high vacuum port 66 of the intake manifold is no longer in communication with the air cleaner 68 and the distributor spark advance control unit 72, so that no auxiliary air is being supplied and no spark-advancing action is being effected by the intake manifold suction. Since there is a negative pressure in pipe 73, the check valve element 78 in check valve 74 will be open, and the check valve element 82 in check valve 70 will be closed, so that the normal action of the suction line 73 upon the spark control diaphragm 80 can take place. In other words, immediately upon the operative de-energization of solenoids 20 and 21 through the action of relay 22, all the above-mentioned air, gas and spark controls are returned to their normal inoperative positions, and the engine is restored to conditions for idling or full power operation.

The electrical means embodied in said relay 22 for operating solenoids 20 and 21 are schematically illustrated in FIG. 1. Said means, contained within a casing generally designated 83, include circuits operatively connected in parallel to both of said solenoids and said gas pedal operated cam switch 23. The relay device 84 within casing 83 comprises the core 85, the spring-loaded switch-actuating armature arm 86 and the relay switch 87, the latter having the two normallly separated contacts 88 and 89—contact 89 being positioned in coactive relation with the terminal 90 of said arm 86, so that when the arm 86 is operatively drawn down upon the magnetization of core 85, terminal 90 will engage contact 89 and cause it in turn to engage contact 88. In the form of my invention illustrated in FIG. 1, said arm 86 is engaged by spring element 91 mounted on the bracket 91a, the arm 86 being normally urged away from contact 89, so that contacts 89 and 90 are normally separated.

Surrounding core 85 is the fine wire coil 92 one end of which is connected to terminal 93 on said bracket 91a and electrically connected by conductor 94 to terminal 95 which in turn is electrically connected by conductor 96 to the resistance 97, the latter being connected to the armature terminal 98 of the conventional voltage regulator 99, said terminal 98 being electrically connected through conductor 99a to the armature of the grounded generator 100. The opposite end of coil 92 is connected to the terminal 101, and the latter is electrically connected to the grounded variable resistor 102.

Disposed over core 85 is another coil of relatively heavy wire 103 and of fewer turns than coil 92, the differential electrical characteristics of said coils being predetermined for purposes to be hereinafter set forth. One end of coil 103 is connected to said terminal 93 and then by said conductor 94 to said terminal 95 in series with the generator 100, the other end of coil 103 being connected by conductor 104 to the fixed resistance 105a mounted within casing 83, said resistance being electrically connected by conductor 105 to the terminal 106. It is important to note that in the particular embodiment illustrated coils 92 and 103 are wound about core 81 in opposite directions.

The said relay switch 87 has thereon two terminals, one being terminal 107 electrically connected by conductor 108 to said contact 89, and the other being terminal 109 electrically connected by conductor 110 to said contact 88. Connected to the terminal 107 is the conductor 111 which leads to the terminal 112 on casing 83; and connected to said terminal 109 is the conductor 113 which leads to terminal 114 on the casing 83 connected to which is the conductor 115 leading to the ignition switch 116 which is connected by conductor 117 to the battery 118 one terminal of which is grounded.

The solenoid 20 contains the solenoid coil 119 within which is operatively disposed the said plunger 27 which is spring-loaded and the lower terminal of which is connected to the said Bowden wire 28 and to the said bar 39 for actuating the said valve 42 in the manner aforesaid. Fixedly mounted upon and insulated from the plunger 27 is the cam 120 proportioned and positioned for operatively actuating, when the plunger 27 is in its upper operatively retracted position, the spring-loaded follower arm 121a of the switch 121—at times referred to as the "demagnetizing switch"—thereby closing the latter switch by electrically connecting its terminals 122 and 123 in known manner. Said terminal 123 is connected through conductor 125 to said terminal 106 of relay device 22; and said terminal 122 is connected through conductor 126 to terminal 127 to which one end of the solenoid coil 119 is connected, the other end of the said coil being connected to terminal 128 on the casing 124. Electrically connecting said terminal 128 and terminal 112 of the relay device is the conductor 129.

The solenoid 21 is substantially like solenoid 20 except that it is not provided with any switch arrangement like switch 121 and associated parts. Solenoid 21 has the solenoid coil 130 within which is operatively disposed the said plunger 64 which is spring-loaded and the lower terminal of which is operatively connected to said valve 43 in the manner hereinabove described. Said coil 130 is electrically connected to the terminals 128a and 143 on casing 124a, the conductor 125a connecting said terminal 128a with conductor 129, whereby the coils 119 and 130 of the two said solenoids are arranged in parallel.

The said cam switch 23 comprises, as aforesaid, the switch member 25 and the cam member 24. Said switch member has the three normally separated spring-loaded contact blades 131, 132 and 133. Said cam member 24 comprises the three position cam 134 and the spring-loaded cam follower 135. In engagement with the upper blade 131 is the push member 136 which is also in contact with the surface 137 of said follower 135, the latter carrying the follower roller 138 in pressing engagement with the said cam 134 which has three cam portions 139, 140 and 141. Upon the operative movement of the cam 134—by the operation of the gas pedal 26 in a manner to be hereinafter described—each of said cam portions can be brought into position for successively actuating the follower member 135 and the button or push member 136—combinatively referred to as the follower means—by opening or closing certain circuits for bringing the above-mentioned controls into and out of action.

The said cam portion 139 engages the roller 138 during predetermined low speed and idler ranges; the cam portion 140 engages said roller during predetermined intermediate speed or cruising ranges; and the cam portion 141 engages said roller during high speed or full power ranges. It will be noted that the three cam portions are in progressively stepped arrangement, the low speed or idling portion 139 being the deepest and producing the greatest throw or movement of the follower means along its operative path, the intermediate or cruising speed portion 140 producing a lesser movement of the follower means. The arrangement is such that when the follower roller 138 is in engagement with cam portion 139, as shown in FIG. 1b, the contact elements 131a and 132a of the respective blades 131a and 132a of the respective blades 131 and 132, and contact elements 132b and 133a of the respective blades 132 and 133, will be in engagement; when said follower roller is in engagement with the cam portion 140, as shown in FIG. 1a, only contact elements 131a and 132a of blades 130 and 132 will be in engagement; and when the follower roller is in engagement with the cam portion 141 as shown in FIG. 1, follower 135 will be in non-actuating relation to the push element 136 and none of said contact elements will be in engagement.

As will be seen from FIG. 1, blade 131 is electrically connected through conductor 142 with the terminal 143 of solenoid 21; blade 133 is electrically connected through conductor 144 with terminal 127 of solenoid 20; and blade 132 is connected to ground.

The circuitry is such, as will more clearly hereinafter be set forth, that during idling the engine is operating under normal conditions, all controls being out of action. During cruising speeds the spark will be advanced and auxiliary air drawn in, thereby providing more air and more burning time efficiently to consume the rich mixture drawn in due to the partial throttle operation. During high speed operation, all controls will be out of action, permitting the engine to run under full power conditions. Upon deceleration from high-speed operation, the spark will be instantly advanced and auxiliary air drawn in again for efficient burning of the fuel under partial throttle conditions. When deceleration is continued to a predetermined low-speed, such as 50 r.p.m. above idling, the idler needle valve will be closed and the fuel from the main nozzle reduced, thereby preventing unduly rich mixtures from being drawn into the engine due to the high vacuum prevailing in the intake manifold, and accordingly avoiding one of the major causes of smog producing emissions.

The operation of the circuitry producing these results over the entire speed range is as follows:

During idling, all three blades 131, 132 and 133 of the switch member 25 are in engagement, as aforesaid, but under such low engine speeds—below the predetermined critical speed—the corresponding low generator speed is insufficient to magnetize the core 85 enough to draw down the armature arm 86, so that the contacts 88, 89 and 90 of the relay switch 87 are out of engagement. Since the solenoid coils 119 and 130 are each in series with said relay switch 87, the open switch will prevent any actuation of the respective solenoid cores 27 and 64. Hence all controls will be off.

When the gas pedal 26 is depressed to the cruising range, the increased generator speed will energize the relay member 84 and cause the armature arm 86 to be attracted to the core 85, thereby bringing the contacts 88, 89 and 90 into mutual engagement. At the same time the cruising portion 140 of the cam 134 will be brought into operative engagement with the roller 138. The consequent engagement of the contact blades 131 and 132 will accordingly close the circuit through the coil 130 of the solenoid 21, causing the core 64 to be actuated so as to operate the said spark and air control valve 43, thereby advancing the spark and drawing auxiliary air from the air cleaner 68 into the intake manifold 47.

When the gas pedal is further depressed to the high-speed range at which the cam portion 141 is in engagement with the follower roller 138, the three contact blades 131, 132 and 133 will be mutually separated, in the manner aforesaid. Hence, even though the relay switch 87 is still closed, both relay circuits will be broken. The respective cores 27 and 64 of both relays will thus instantly snap down into inoperative positions, putting all controls out of operation. The engine is now operating under full-power conditions.

When the gas pedal is released to decelerate the engine to cruising speeds at which the intermediate cam portion 140 is in engagement with the follower roller 136, the resultant operative engagement of the contact blades 131 and 132 will again close the circuit through the coil 130 of the solenoid 21, since the armature arm 86 is still being attracted to the core 85 and the relay switch 87 closed. The spark advance and auxiliary air controls are thus set into operation. These controls, in addition to effecting the efficient burning of fuel drawn in at partial throttle conditions as aforesaid, also serve to effect the burning of the residual rich mixture in the intake manifold drawn in during the previous open throttle conditions.

When the vehicle is further decelerated to a degree to bring the low-speed cam portion 139 into operative engagement with the follower roller 138, all three contact blades 131, 132 and 133 will be in engagement; and as long the engine speed is still above the said predetermined critical speed and the consequent generator voltage above a corresponding critical voltage, the armature arm 86 will still be held down by the relay core 85, and the relay switch 87 will be closed. The circuits through both solenoids 20 and 21 will thus be closed, and all four controls will be in operation, to wit, the spark advance, the auxiliary air, the float-bowl main jet and the idler shut-off controls. Hence, under closed throttle conditions when the relatively high intake manifold vacuum exerts its maximum pull at the idler and main jet orifices, this device shuts the idler orifice and reduces the pull at the main jet, thereby obviating the formation of an unduly rich mixture, and at the same time further leans the mixture by introducing auxiliary air and performs the additional function of advancing the spark to increase the burning time.

It should be noted that while the plunger 27 of the solenoid 20 is in its operative position, the switch 121 is in its closed position, whereby the circuit through the second relay coil 103 — the demagnetizing coil — is maintained in closed condition, said latter circuit including the conductors 144, 125, 105, 91, 104, 103 and ground. As the generator voltage is being decreased due to further deceleration, the magnetizing action of the core 85 is being progressively decreased, due both to the action of the demagnetizing coil 103 and the decreasing magnetizing action of the coil 92. The resistances 102 and 105a are set to effect a complete demagnetization of the core at below said critical voltage. As the generator voltage approaches that critical point during deceleration, the magnetizing force of the core 85 is reduced to a condition of such weakness that it will quickly release the arm 86 at said critical generator voltage, thereby effecting a quick and positive return of all controls to normal operating conditions. This quick and positive action eliminates all danger of stalling at the instant of resoration of normal operative conditions.

The operation of this invention for various speeds, as above-described, thus effects complete combustion of the fuel-air mixture drawn in under controlled conditions; and by burning all the fuel before the gases reach the exhaust ports, the exhaust emissions are free of smog-producing ingredients.

It is to be observed that the speeds at which the controls are brought into operation can be varied by means of the adjustable cam 134 illustrated. By the adjusting means hereinbelow described, the operative length of the intermediate cam portion 140 can be lengthened or shortened, thereby selectively determining the vehicle speeds during the cruising controls are in operation, as well as the time and engine speeds when the low-speed deceleration controls are brought into operation. Such selective adjustment makes this device adaptable for use with various makes and types of cars, and in accordance with officially set standards.

In the illustrated embodiment of the said three-position cam 134, the three operative portions thereof 139, 140 and 141 are in the form of three successively ovelapping plates 139a, 140a and 141a, plate 141a being the longest, plate 139a being shortest and the middle plate 140a being of an intermediate length. The said plate 140a is adjustably movable longitudinally with respect to the other two plates, having an elongated slot 145, a screw 146 extending through the plate 139a and said slot 145, and being in threaded engagement with the plate 141a. The arrangement is such that by loosening said screw 146, plate 140a can be shifted so as either to lengthen or shorten the operative portion 140 thereof, thereby correspondingly varying the length of time the follower member 135 will be operatively actuated by said portion 140 for cruising speed operation.

Said cam member 24 is carried by the bracket 147 which is pivotally mounted on the shaft 148 affixed to the lug 149 of the intake manifold casting 150. In the illustrated structure, said bracket contains three arms, to wit, arms 151, 152 and 153. The arm 151 operatively supports the cam member 24. The arm 152 is connected to the rear extension 154a of spring 154 suitably affixed to the engine structure, and is also connected to the rearwardly extending link 155 pivotally connected to the arm 156 of the gas pedal bell-crank 157, the other arm 158 of said bell-crank being pivotally connected to the actuating rod 159 the rear portion of which is connected to the gas pedal 26 pivotally attached to the floor board 160. The spring 161 mounted over the said actuating rod 159 urges the gas pedal 26 into its retracted position in known manner. The details of construction of the gas pedal arrangement are not herein described since they are known to those skilled in the art. Suffice to say for the purpose of this specification that upon a depression of the gas pedal the said link 155 will move in the direction of arrow C, causing the said bracket 147 to rotate in a clockwise direction (FIG. 3), and causing the cam member 24 to move rearwardly whereby the follower roller 138 of the switch 25 will move from the engaged portion of the low speed cam portion 139 to the cruising speed portion 140, and then to the high speed portion 141 of the cam. A release of said gas pedal 26 will operatively cause said cam member 24 to move in the opposite direction.

The said arm 153 of said bracket 147 is connected by the links generally designated 162 to the throttle control in a manner known to those skilled in the art. Upon an operative depression of gas pedal 26, the consequent clockwise rotation of bracket 147 will cause the throttle valve 77 to move in an opening position, and upon an opposite rotation of said bracket the throttle will move towards a closed position.

The said switch member 25 is mounted upon the bracket 164 which is in fixed relation to the said intake manifiold casting 150. Suitably supported guide rollers 166 and 167 flank and are in rollable engagement with the bottom portion of said cam plate 141a, as shown in FIG. 7. The follower roller 138 is urged by the spring arm 168 into yieldable engagement with the cam member, so that upon an operative movement of said cam member 24 the follower roller 138 will at all times be in engagement with one of the said three cam portions.

The said spring arm 168 supporting the follower roller 138 is mounted on the switch member 25 in known manner, said arm being engageable with the push member or button 136 which is in engagement with the adjacent contact blade 131, as aforesaid. (See FIGS. 1 and 3.) The two terminals 131c and 133c on the switch member 25 have connected thereto the respective two leads 142 and 144 which extend to the control casing 171 containing therein the said solenoids 20 and 21, the control relay 83, and related circuitry elements in an arrangement to be hereinbelow described.

The arrangement of the components contained within the said casing 171 is such as to enable the entire unit to be mounted on any stationary part of the vehicle and connected, by flexible piping, to the air cleaner 68, intake manifold 47 and distributor vacuum actuator 72. Casing 171 may accordingly be mounted within the seating area, such as on the dashboard, or under the hood, as on the valve cover 172 in the embodiment illustrated. As shown in FIG. 4, the inverted-U-shaped bracket 173 is placed over the said valve cover, the legs 173a and 173b being suitably secured, such as by bolting 174, to the bottom flange 175 of said cover, the said casing 171 being suitably secured by fasteners 176 to the base 177 of said bracket 173. The arrangement of the components within said casing 171 is such that, in one physical embodiment of my invention, the entire unit occupies a space about 2" x 4" x 6".

In the preferred arrangement of the components within said casing 171, the said fuel control solenoid 20 and its coactive float bowl control valve 42 are disposed upon the base 178 of the casing 171. Mounted on the wall 179 of said control unit is the spark and air control solenoid 21, and directly adjacent thereto is its coactive valve member 43. Supported on a lateral portion of said wall 179 is the insulating panel 180 comprising an inner portion 181 and an outer panel portion 182, each containing terminals to which various conductors associated with the control components are electrically connected. In spaced relation to said inner panel portion 181 is the supporting wall 183 upon which is mounted the said control relay 83. The electrical connections between said control relay 83 and the said solenoids 20 and 21 are like those diagrammatically set forth in FIG. 1.

The plunger 27 of said solenoid 20 carries the arm 184 to which is connected the rod 185, the arrangement being such that operative movements of said solenoid plunger 27 will cause corresponding movements of said rod 185, the latter being operatively connected to the internal valve member 42a (see FIG. 14) to open and close the respective inlet and outlet ports 48 and 45 of valve member 42. The said rod 185 also carries the cam 120 in engagement with the follower spring arm 121a of the switch member 121. Upon an operative actuation of said solenoid plunger 27, the rod 185 will move in the direction of arrow D to open the said inlet and outlet ports 48 and 45 of said valve 42, and at the same time actuate the follower arm 121a to close the switch 121. Also connected to solenoid plunger 27 is the rod 186 slidably movable, in known manner, within the fitting 187 mounted on wall 188 of said casing 171, the said Bowden wire 28, connected to said rod 186, being disposed within the flexible sheath 28a and operatively connected to the idler needle valve 34.

In the particular construction illustrated in FIGS. 15 to 20, said needle valve 34 and associated parts are operatively supported by the bracket 189 the base 189a of which is secured to the carburetor mounting 190, the needle valve entering the idler orifice 35 at a downward inclination, indicated in FIGS. 19 and 20. Said bracket contains a guide slot 191 within which is slidably mounted the slide member 192 carrying the lug 193 through which the adjusting screw 194 extends, the end of said screw being in abutment with the needle valve head 195. The pivotally supported lever 196 comprises equal arms 197 and 198, the arm 197 being connected to said slide member 192 by the pin 202 extending through the slot 202a, the other lever arm 198 carrying the fitting 199 to which the adjacent terminal of said Bowden wire 28 is detachably secured by the screw 199a.

The arrangement is such that the operative movement of the solenoid plunger 27 will cause the Bowden wire 28 to actuate the lever 196 and impart a corresponding movement to said screw 194 and the needle valve 34, against the action of the springs 200 and 201. Because of the fact that the arms of the lever 196 are equal, the operative movement of the Bowden wire 28 corresponds exactly to the operative movement of the idler valve 34, thereby facilitating the proper adjusting positioning of said valve.

Positioned within the casing 171 and connected to the inlet and outlet connections 48 and 45 of valve member 42 are the respective internal pipe sections 49a, and 46a, these extending to the respective fittings 203 and 204 supported by the said wall 179 of the casing 171. There is also a fitting 205 to which the internal section 58a is attached, the latter being connected to the intake connection 59 of the valve member 43. The arrangement is such that outer pipes can readily be attached for operative purposes. Extending outwardly from said fitting 203 is the pipe 51 which extends to and is connected with the upper wall of the float bowl 52. In the construction illustrated, the air vent control 50 connected to pipe 51 is shown adjacent the fitting 203. Extending outwardly from the fitting 204 is the pipe 61 which is connected to the piping operatively connected to the air cleaner 68, the distributor vacuum actuator 72 and pipe line 73 substantially in the manner illustrated in FIG. 2.

The said valve member 43 operatively connected to the solenoid 21 is constructed substantially like the said valve member 42. The plunger 64 of solenoid 21 carries the arm 206 to which is connected the rod 165, said rod being attached to an internal valve member 43a (like said valve member 42a of valve 42) for opening and closing the respective inlet and outlet ports 62 and 59. Extending from said valve member 43 are the two internal pipe sections 58a and 61a, the former being connected to said fitting 205 on the said wall 179 of the casing 171, and the latter being connected to the manifold 207 mounted on the inside of said wall 179, to which the said internal pipe section 61a from valve 43 is also attached, said pipe sections 58a and 61a being in communication within said manifold. Extending outwardly from said fitting 205 is said pipe line 58 which is connected to the high vacuum port 66 of the intake manifold. Connected to the said T-connection 73a is section 73c of pipeline 73 which is connected to the port 79 of the carburetor above the throttle 77 (see FIG. 2), and attached to the other end of the T-connection 73a is the section 73d of pipe 73 which is connected to the distributor spark actuator 72. Between sections 69a and 69b of pipeline 69 is the said one-way valve 70, and in pipeline 73 is the one-way valve 74.

The above arrangement of pipelines, valves, solenoids and internal wiring is functionally similar to the arrangement schematically illustrated in FIG. 2. The parts, however, are physically arranged in such compact form as to enable them to be fully contained within the relatively small casing 171, the flexible outer pipe and wiring connections to said casing enabling the control unit to be positioned to suit the specific space requirements of any vehicle, and to render the device conveniently accessible.

The electrical circuitry within casing 171 is substantially like that indicated in the schematic diagram of FIG. 1, and comprises electrical components mounted for ready assembly and in effective coactive relation with respect to the various electrical components of the device. For example, the said wall 183 carries the terminals 106 and 103a connected to the resistor 105a, terminals 106 being connected to the terminal 123 of said switch 121 by the short conductor 125, the terminal 103a being connected by the short conductor 104 to the terminal 103b electrically connected to the relay winding 103. Terminal 101, also carried by the said wall 183, is electrically connected to the winding 92 and the variable resistor 102 mounted on the wall 179 of casing 171. The terminal 103e is electrically connected by conductor 94 to the terminal 95 of panel 180 from which conductor 96 leads to the generator 100. The said wall 183 is proportioned to carry said relay control member 83 and associated parts, and is perforated at 107a and 109a to permit the passage therethrough of the respective conductors 111 and 113 for connection to the respective terminals 131*d* and 133*d* on the panel 180. From said terminals 131*d* and 133*d* the respective conductors 142 and 144 can be readily connected to the respective terminals 131*c* and 133*c* of the cam switch member 23; and from terminals 114 and 95 on said panel 180 the respective conductors 115 and 96 can readily be connected to the ignition switch and generator in the manner indicated on the wiring diagram of FIG. 1.

The relay member 83, in the preferred form thereof illustrated, is substantially like the corresponding member described in said Patent No. 3,003,437. The winding 103 envelopes the winding 92, the latter being wound about the core 85. The armature member 86, operatively disposed over the core 85, is spring loaded and is pivotally connected at 210, the armature arm 86*a* disposed over the switch 87 carrying the contact 90 for operative engagement with the underlying contact in the manner shown in FIG. 9.

The invention above described can either be made an integral part of a conventional internal combustion engine or readily added as an appurtenance thereto, the necessary electrical and piping connections requiring no changes in the basic construction of the engine. In either form the device performs its fuel admission and combustion control functions, as well as its smog eliminating functions, through its spark timing and auxiliary air controls in coaction with its idler and main jet fuel controls—at all speed ranges.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:
1. In an internal combustion engine having an intake manifold and a distributor vacuum actuator for advancing the spark timing, the combination of conduit means communicating with said intake manifold and having a branch portion connecting said intake manifold with said actuator, a valve member in said branch portion movable between closed and open positions relative thereto, electro-mechanical means operatively connected to said valve member to move it between said positions, and electrical operating means to actuate said electromechanical means, whereby when said valve member is operatively brought by said electro-mechanical means to its said open position said intake manifold will be in communication with said distributor vacuum actuator so that the vacuum in the intake manifold will operatively draw said actuator into a spark advance position.

2. In an internal combustion engine having an intake manifold, air inlet means and a fuel mixture passageway operatively communicating with said air inlet means and said intake manifold, the combination of conduit means communicating with said intake manifold and having a branch section by-passing said passageway and connecting said intake manifold with said air inlet means, a valve member in said branch section movable between closed and open positions relative thereto, electro-mechanical means operatively connected to said valve member to move it between said positions, and electrical operating means to actuate said electro-mechanical means, whereby when said valve member is operatively brought by said electro-mechanical means to its said open position said intake manifold will be in communication with said air inlet means so that the vacuum in the intake manifold will operatively draw air from said air inlet means into said intake manifold.

3. In an internal combustion engine having air inlet means and a fuel mixture passageway operatively communicating with said air inlet means and said intake manifold, the combination according to claim 1, said conduit means having a branch section by-passing said passageway and communicating with said branch portion, whereby said conduits branch section and branch portion are both in connecting communication between said intake manifold and said air inlet means, said valve member being so positioned in said conduit means that when it is in its said open position said intake manifold will be in communication through said conduit means both with said distributor vacuum actuator and said air inlet means, whereby upon the operative valve-opening actuation of said electro-mechanical means the vacuum in the intake manifold will simultaneously draw said actuator into a spark advance position and draw auxiliary air from said inlet means into said intake manifold.

4. In an internal combustion engine, the combination according to claim 1, said electrical means for actuating said electro-mechanical means being responsive to engine speeds.

5. In an internal combustion engine having a generator and a gas pedal, the combination according to claim 4, and switch means operatively associated with said gas pedal, said electrical operating and electro-mechanical means being electrically connected to said switch means and said generator and being operatively responsive to a predetermined critical voltage of said generator, whereby the operative actuation of said electro-mechanical means will actuate said valve member independent of the pressure in said intake manifold.

6. In an internal combustion engine, the combination according to claim 3, said valve having an inlet and an outlet port, said branch section of said conduit means having a first pipe extending from the outlet port of said valve member to said intake manifold and a second pipe connected to the inlet port of said valve member and communicating with said air inlet means, said branch portion of said conduit means having said first and second pipes and a third pipeline communicating between said second pipe and said distributor vacuum actuator, and a fourth pipe communicating between said actuator and said fuel mixture passageway, said third and fourth pipes being connected at a point intermediate said actuator and said mixture passageway, said third pipe having therein a first check valve operatively movable to an open position in response to suction in said second pipe, said fourth pipe having therein a second check valve intermediate said mixture passageway and the juncture of said third and fourth pipes, said second check valve being operatively movable to a closed position in response to suction in said third pipe, whereby when said valve member is in its operatively open position said second check valve will be closed and said fuel mixture passageway will be out of communication with said distributor vacuum actuator and said first check valve will be open and the intake manifold will be in communication with said actuator and said air intake means, and when said valve member is in its operatively closed position said first check valve will be closed and said second check valve open whereby the intake manifold will be out of communication with said air intake means and said actuator and said mixture passageway will be in communication with said actuator.

7. In an internal combustion engine, the combination according to claim 3, said engine having a carburetor with a float bowl and an air chamber therein, a low-speed fuel inlet communicating with said mixture passageway, a needle valve operatively associated with said fuel inlet and movable between a normally open position and an operative closed position relative to said inlet, said conduit means having piping means communicating between said intake manifold and said float bowl chamber, and a float bowl control valve connected to said piping means and movable between a normally closed position and an operative open position relative thereto, and second electro-mechanical means, said electrical operating means being operatively connected to said second electro-mechanical means for actuating said latter means, said second electro-mechanical means being operatively connected to said needle valve and said float bowl control valve to move them from their said respective normal positions to their respective operative positions, whereby upon the operative energization of said second electro-mechanical means said needle valve will be closed and said float bowl control valve will be opened.

8. In an internal combustion engine, the combination according to claim 7, said first-mentioned valve member and said float bowl control valve each having inlet and outlet ports, said outlet port of said float bowl control valve communicating with the inlet port of said first-mentioned valve member, whereby only upon the operative opening of both said float bowl control valve and said first-mentioned valve member said float bowl chamber will be in communication with said intake manifold.

9. In an internal combustion engine, the combination according to claim 7, said electro-mechanical means having two solenoids each with a movable plunger, one of said plungers being operatively connected to said needle valve and said float bowl control valve, the other of said plungers being operatively connected to said spark control valve, said electrical operating means having two electrical circuits in parallel operatively connected to said respective solenoids.

10. In an internal combustion engine, the combination according to claim 3, said electrical operating means having a first electrical circuit having a battery and an electric generator connected to said engine, whereby the speed of the engine will control the voltage of the generator, electrical relay means comprising a core and two opposing conducting coils operatively disposed thereabout, the first being a magnetizing coil and the second a demagnetizing coil, said first electrical circuit being operatively connected to said electro-mechanical means for actuating said valve member, a relay switch in said first electrical circuit, an armature arm in operative relation to said core and movable between two respective limiting positions when said core is operatively magnetized and operatively demagnetized, said armature arm being positioned for engaging said relay switch when said arm is in one of its said limiting positions to operatively close said relay switch whereby said electro-mechanical means will be operatively actuated to actuate said valve member, a second electrical circuit connecting said generator to said first coil, a third electrical circuit connecting said generator to said second coil, a demagnetizing switch member in said latter circuit, the electrical characteristics of said respective coils and their said respective circuits being such that in response to generator voltage above a predetermined critical magnitude said core will be magnetized to a degree sufficient for magnetically holding said arm, and in response to generator voltage below said critical magnitude said core will be operatively demagnetized, said electrical characteristics being also such that at the time of the operative closing of said switch member the consequent energization of said second coil will occur when the generator voltage is at a greater magnitude than said critical magnitude, said generator being operable at a range of speeds for producing voltage of magnitudes ranging from below to above said critical magnitude.

11. In an internal combustion engine, the combination according to claim 10, said demagnetizing switch member being operatively engageable by said electro-mechanical means for closing said switch member upon an operative actuation of said electro-mechanical means.

12. In an internal combustion engine having an intake manifold, a carburetor with a float bowl and an air chamber therein operatively associated with the main jet, a fuel mixture passageway and air inlet means communicating with said manifold, an idler needle valve operatively associated with an idler orifice, and a distributor vacuum actuator for controlling the spark-timing, the combination of a multiple branch conduit system having three interconnected branch portions bypassing said carburetor fuel mixture passageway and communicating between said intake manifold and said distributor vacuum actuator, said carburetor air inlet means and said float bowl air chamber, respectively; valve means operatively connected to said branch portions; electro-mechanical means operatively connected to said valve means and to said idler needle valve, respectively; and control means for actuating said electro-mechanical means; whereby the operative actuation of said control means will control fuel admission through said idler orifice by the actuation of said idler needle valve, and will control fuel admission through the main jet, spark timing and the admission into the intake manifold of auxiliary air from said carburetor inlet means through the actuation of said valve means associated with said conduit branch portions.

13. In an internal combustion engine, the combination according to claim 12, said valve means comprising a float bowl control valve operatively connected to said conduit branch portion communicating with said float bowl chamber and a spark and air control valve operatively connected to the two conduit branch portions communicating with said distributor vacuum actuator and said carburetor air inlet means, respectively; said electro-mechanical means comprising two solenoids, to wit, a first solenoid operatively connected to said spark and air control valve and a second solenoid operatively connected to said float bowl valve and said idler needle valve; said control means having electrical actuating means operatively connected to said two solenoids.

14. In an internal combustion engine, the combination according to claim 13, said electrical actuating means having means for selectively actuating said respective solenoids, said latter means being responsive to engine speeds.

15. In an internal combustion engine, the combination according to claim 13, said electrical actuating means having sequential switch means electrically connected to said respective solenoids, and selective means for actuating said sequential switch means, whereby said solenoids may be sequentially actuated at predetermined times.

16. In an internal combustion engine, the combination according to claim 15, said sequential switch means comprising a switch member having a plurality of pairs of coactive contact means electrically connected to said respective two solenoids and cam means engageable with said switch member for bringing into engagement selected pairs of said contact means to actuate the solenoid that is electrically connected to the engaged pair of contact means, said selective means comprising a movable member coactively connected with said switch means for operatively bringing into engagement said cam means and said switch member.

17. In an internal combustion engine, the combination according to claim 16, said switch member having three normally separated contact blades comprising a first blade, a second blade and a third blade, said first and second blades being mutually engageable and electrically connected to said first solenoid, said second and third blades being mutually engageable and electrically connected to said second solenoid, said cam means having follower means engageable with said first blade and movable along an operative path for successively bringing said first and second blades into engagement and then said second and third blades into engagement, whereby said first and second solenoids will successively be actuated, said cam means having a multi-stepped portion operatively connected with said follower means for moving it along its said operative path.

18. In an internal combustion engine, the combination according to claim 17 in combination with the gas pedal of the engine, said movable member constituting said gas pedal, said multi-stepped cam portion being movable relative to said switch member, and linkage operatively connecting said gas pedal and said cam portion, whereby the operative movement of said pedal will cause said cam portion to move along a predetermined operative path for operatively actuating said switch member.

19. In an internal combustion engine, the combination according to claim 18, said gas pedal being operatively movable along a path comprising three predetermined speed range sections, to wit, an idling section, an intermediate-speed section and a high-speed section, and multi-stepped cam portion having three operative portions positioned for successive engagement with said follower member and arranged in a sequence corresponding to that of said respective speed range sections of said gas pedal, said three portions being an idling-speed portion, an intermediate-speed portion and a high-speed portion, said idling speed portion being so proportioned as to actuate said follower means along its said operative path to bring said three contact blades into mutual engagement, whereby both of said solenoids will be electrically connected to said switch member, said intermediate-speed portion being so proportioned as to actuate said follower means along its said operative path to bring said first and second contact blades into operative engagement, whereby said first solenoid will be electrically connected to said switch member, the said high-speed portion being so proportioned as to be in non-actuating relation with said follower means, whereby the circuits between said switch member and both of said solenoids will be open.

20. In an internal combustion engine, the combination according to claim 19, said idling-speed cam portion being the deepest of said three cam portions, said intermediate-speed cam portion being of greater thickness than said high-speed cam portion.

21. In an internal combustion engine, the combination according to claim 19, said multi-stepped cam portion having three successively overlapping plates constituting said three operative cam portions, at least one of said plates being adjustably positionable with respect to the other plates.

22. In an internal combustion engine, the combination according to claim 21, said intermediate-speed plate being longitudinally movable with respect to the other plates, and releasable means to secure said intermediate-speed plate in a selected position.

23. In an internal combustion engine, the combination according to claim 12, said electro-mechanical means having a solenoid, means for actuating said solenoid, a flexible wire connected to the plunger of said solenoid, a bracket operatively supporting said needle valve, a guide slot in said bracket, a slide member in slidable engagement with said guide slot and operatively connected to said needle valve, and a pivotally mounted lever, one arm of said lever being connected to said slide member, the other arm being connected to said flexible wire.

24. In an internal combustion engine, the combination according to claim 23, the two arms of said lever being of equal lengths.

25. In an internal combustion engine, the combination according to claim 16 in combination with the engine's gas pedal, said switch member being fixedly mounted, a pivotally mounted bracket with a plurality of arms, one of said arms carrying said cam means in operative relation to said switch member, another of said arms being operatively connected to said gas pedal.

26. In an internal combustion engine, the combination according to claim 16, said cam means being operatively connected to said movable member and being movable by said member along an operative path in coactive relation with said switch member, said cam means having a flat wall portion in adjacent relation to said switch member, and roller guide means in rollable engagement with said flat wall portion for guiding said cam means along its said operative path in predetermined relation to said switch member.

27. In an internal combustion engine, the combination according to claim 15 in combination with a casing, said control means having relay switch switch means electrically connected to said sequential switch means; said float bowl control valve, said spark and air control valve, said two solenoids and said relay means being attached to said casing; said conduit branch portions having internal pipe sections contained within said casing and corresponding sections external to said casing, said casing having pipe fittings thereon to which said corresponding internal and external pipe sections are separately connected, whereby said external pipe sections can be separated from said casing.

28. In an internal combustion engine, the combination according to claim 27 in combination with a generator, said sequential switch means being disposed outside of said casing, electric terminals supported by said casing and electrically connected internally to said relay means and said solenoids, and external wiring operatively connected to said respective terminals and extending outwardly to said generator and switch means, whereby said external wiring can be separated from said casing.

29. In an internal combustion engine, the combination according to claim 28, and a flexible wire detachably secured to the plunger of said second solenoid and connected through a wall of said casing to said idler needle valve.

30. In an internal combustion engine, the combination according to claim 28, said casing having as a portion thereof a wall supporting said respective pipe fittings, an insulating panel having thereon said electric terminals, said panel being supported by said wall, and an inner supporting wall spaced from said insulating panel, said supporting wall carrying said relay means, said solenoids and said float bowl and spark and air control valves being in spaced relation to said supporting wall and said relay means.

31. In an internal combustion engine, the combination according to claim 30, said float bowl control valve being in adjacent relation to said second solenoid, and said spark and air control valve being in adjacent relation to said first solenoid, the plunger of each of said solenoids being operatively connected with the coacting adjacent valve, said respective valves being normally closed, whereby the operative actuation of said solenoids will cause said valves to open.

32. In an internal combustion engine, the combination according to claim 27 in combination with the valve cover of the engine, an inverted U-shaped bracket secured in straddling relation to said valve cover, said casing being mounted upon and secured to said bracket.

33. In an internal combustion engine, the combination according to claim 15, said selective means constituting the gas pedal of the engine, said gas pedal being operatively movable along a path comprising three predetermined speed ranges, to wit, an idling speed section, an intermediate-speed section and a high-speed section; an electrical generator operatively connected to the engine whereby the generated voltage is proportioned to the engine speed; said solenoids being normally inoperative; electric operating means for actuating said solenoids having a circuit including a source of electrical energy, said solenoids and said sequential switch means; relay switch means in said circuit; said solenoids being in parallel; said relay switch means being electrically connected to said generator and being responsive to a predetermined critical voltage above that produced by said generator during said idling speed range, whereby said relay switch means will be closed at generated voltages above said critical voltage and open at voltages below said critical voltage; said sequential switch means having a plurality of pairs of coactive contacts electrically connected to said two solenoids, and connecting means between said gas pedal and said sequential switch means for bringing into engagement selected pairs of said contacts, whereby the coactive contacts of predetermined pairs will be brought into operative engagement, said contacts comprising a first plurality of contact elements electrically connected to both of said solenoids whereby when said relay swich means is operatively closed both of said solenoids will be actuated upon a closing of said first plurality of contacts, and a second plurality of contact elements electrically connected to said first solenoid, whereby when said relay switch means is operatively closed only said first solenoid will be actuated upon a closing of said second plurality of contacts; said pedal and said connecting means being so positioned and proportioned that when said pedal is in the said idling section of its operative path said first plurality of contact elements will be in operative engagement, when said pedal is in the said intermediate-speed section of its path only the said second plurality of contact elements will be in operative engagement, and when said pedal is in the said high-speed section of its path all of said contact elements will be out of engagement.

34. In an internal combustion engine, the combination according to claim 33, and electrical means operatively connected to said second solenoid and said relay switch means exerting a switch-opening effort on said relay switch means upon the operative actuation of said second solenoid.

References Cited

UNITED STATES PATENTS

| | | |
|---|---|---|
| 3,177,968 | 4/1965 | Goerke et al. _____ 123—102 |
| 3,080,858 | 3/1963 | Kane _____ 123—102 |
| 3,374,777 | 3/1968 | Walker. |
| 3,400,698 | 9/1968 | Kelly. |

CORNELIUS J. HUSAR, *Primary Examiner.*

U.S. Cl. X.R.

123—102

PO-1050
(5/69)

UNITED STATES PATENT OFFICE
CERTIFICATE OF CORRECTION

Patent No. 3,446,195      Dated May 27, 1969

Inventor(s) Frank A. Kane, Jr.

It is certified that error appears in the above-identified patent and that said Letters Patent are hereby corrected as shown below:

Column 1, line 62, delete "in". Column 3, line 35, insert --the-- before "fuel-air". Column 4, line 58, insert a comma after "play and". Column 5, line 6, insert --the-- before "two", and delete "the" after "two". Column 7, line 62, delete "their"; line 73, change "barburetor" to --carburetor--. Column 10, line 5, delete "of the respective blades 131a and 132a". Column 11, line 21, insert --as-- after "long"; line 70, insert --which-- after "during". Column 12, line 35, after "Suffice" insert --it--. Column 16, line 1, change "condiuts" to --conduit's--. Column 17, line 14, insert --will-- after "member"; line 15, delete "will". Column 19, line 9, change "and" before "multi" to --said--. Column 21, line 4, change "swich" to --switch--.

SIGNED AND
SEALED
JAN 27 1970

(SEAL)
Attest:

Edward M. Fletcher, Jr.
Attesting Officer

WILLIAM E. SCHUYLER, JR.
Commissioner of Patents